US012359483B2

(12) United States Patent
Wittelsbürger et al.

(10) Patent No.: US 12,359,483 B2
(45) Date of Patent: Jul. 15, 2025

(54) DRIVE DEVICE FOR A CLOSURE ELEMENT OF A MOTOR VEHICLE

(71) Applicant: Brose Fahrzeugteile SE & Co. Kommanditgesellschaft, Bamberg, Bamberg (DE)

(72) Inventors: Michael Wittelsbürger, Bamberg (DE); Thomas Stöhr, Pfarrweisach (DE); Rainer Jarand, Ahorn (DE); Marco Schramm, Seßlach (DE); Andreas Weigand, Hausen (DE); Alwin Macht, Ebensfeld (DE); Harald Krüger, Bamberg (DE); Matthias Fischer, Itzgrund (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 1171 days.

(21) Appl. No.: 16/766,157

(22) PCT Filed: Nov. 8, 2018

(86) PCT No.: PCT/EP2018/080614
§ 371 (c)(1),
(2) Date: Oct. 12, 2020

(87) PCT Pub. No.: WO2019/101538
PCT Pub. Date: May 31, 2019

(65) Prior Publication Data

US 2021/0040785 A1 Feb. 11, 2021

(30) Foreign Application Priority Data

Nov. 24, 2017 (DE) .................... 10 2017 127 859.1

(51) Int. Cl.
*E05F 1/10* (2006.01)
*E05F 15/622* (2015.01)
*E05F 3/22* (2006.01)

(52) U.S. Cl.
CPC ............ *E05F 1/105* (2013.01); *E05F 15/622* (2015.01); *E05F 3/224* (2013.01);
(Continued)

(58) Field of Classification Search
CPC .......... E05F 1/105; E05F 15/622; E05F 3/224
See application file for complete search history.

(56) References Cited

U.S. PATENT DOCUMENTS

2015/0069869 A1 * 3/2015 Loeffler ................. F16H 25/20 310/80
2016/0312510 A1 * 10/2016 Hamminga ............... F03G 1/02
(Continued)

FOREIGN PATENT DOCUMENTS

DE 10353245 A1 6/2005
DE 20 2010 009 334 * 11/2011
(Continued)

*Primary Examiner* — Gregory J Strimbu
(74) *Attorney, Agent, or Firm* — Dickinson Wright PLLC

(57) ABSTRACT

A drive apparatus for a closure element of a motor vehicle, including a tube defining an axis, a spindle disposed within the tube and configured to move from an extended position to a first retracted position and a second retracted position, a spindle nut disposed within the tube and operatively engaged to the spindle, a stop nut fixed to the spindle, and a damping element disposed between the spindle nut and the stop nut. The tube defines a first end stop face and the stop nut defines a second end stop face, and when the spindle is in the first retracted position, the damping element engages the first end stop face and is spaced apart from the stop nut.

17 Claims, 3 Drawing Sheets

(52) U.S. Cl.
CPC ... *E05Y 2201/224* (2013.01); *E05Y 2201/408* (2013.01); *E05Y 2201/474* (2013.01); *E05Y 2201/70* (2013.01); *E05Y 2201/702* (2013.01); *E05Y 2900/532* (2013.01)

(56) References Cited

U.S. PATENT DOCUMENTS

| | | | | |
|---|---|---|---|---|
| 2019/0284861 | A1* | 9/2019 | Goto | E05F 15/622 |
| 2020/0232267 | A1* | 7/2020 | Rehm | E05F 1/1058 |
| 2020/0291710 | A1* | 9/2020 | Kummer | B60J 5/10 |
| 2022/0333423 | A1* | 10/2022 | Leonard | E05F 15/622 |

FOREIGN PATENT DOCUMENTS

| | | | |
|---|---|---|---|
| JP | 2016532036 | A | 10/2016 |
| WO | 2015032554 | A1 | 3/2015 |
| WO | WO 2021/023742 | * | 2/2021 |

* cited by examiner 1
8
4
3
5
15a
12
10
15b
6
7
9
15
16
19
17a
17
17b 15a
21
23
15b
10
22a
19
20
13
19a
14
12
11
16
19b

DRIVE DEVICE FOR A CLOSURE ELEMENT OF A MOTOR VEHICLE

CROSS-REFERENCE TO RELATED APPLICATIONS

This application is the U.S. National Phase of PCT Application No. PCT/EP2018/080614 filed on Nov. 8, 2018, which claims priority to German Patent Application No. DE 10 2017 127 859.1, filed on Nov. 24, 2017, the disclosures of which are hereby incorporated in their entirety by reference herein.

TECHNICAL FIELD

The present disclosure relates to a drive apparatus for a closure element of a motor vehicle.

BACKGROUND

The term "closure element" is to be understood broadly. Closure elements of this type include tailgates, trunk lids, engine hoods, doors, in particular side doors, load compartment floors or the like of a motor vehicle.

The drive apparatus in question has gained more and more significance in recent years, in order to provide a high degree of comfort to the user. This applies, in particular, to large closure elements of a motor vehicle, the weight of which makes manual opening or closing movements of the closure element difficult. In a case of this type, the drive apparatus can assume the opening and/or closing operation and, in addition, allows the closure element to be held in the open position or intermediate positions.

SUMMARY

A spring arrangement is integrated into a drive apparatus, and the spring arrangement prestresses the two drive sections which can be moved with respect to one another into the extended position of the drive apparatus against one another. Here, the spring arrangement provides spring forces of a considerable magnitude.

In order to increase the operational safety, a damping device is may be provided between the end stop faces configured to move toward one another in the case of a movement into the extended position of the drive apparatus, which damping device, during a drive movement into the end stop, damps the drive movement in a manner which is dependent on the speed of the drive movement. The damping device may include a damping element that may be formed a bushing made from an elastomer. A damping action of an impact between the end stop faces may be created as the damping element is compressed axially between the end stop faces. The damping element may be arranged between two end stop faces, of which in each case one is provided on one of the drive sections which can be moved relative to one another. The damping element firstly achieves a damping action by virtue of the fact that it can be deformed plastically and therefore itself absorbs part of the impact energy. Secondly, in the case of the impact of one of the end stop faces, the damping element may be deflected out of its original position and, in the deformed state, is moved by way of the one end stop face in the direction of the other end stop face, as a result of which a further part of the impact energy is absorbed.

It is to be noted that the damping action in question here may not occur during normal operation of the drive apparatus, but rather only in the case of an improper use situation when, for example, the user applies excessive opening forces in the case of manual opening of the closure element or, in the case of a failure of components when, for example, a drive connector of the drive apparatus is detached unintentionally from the closure element or the edge region of the closure element opening. The plastic deformation of the damping element firstly and the movement of the plastically deformed damping element over a predefined distance toward the respective other end stop face secondly therefore occur only in the indicated special situations, in order to prevent relatively great material damage or even injury to persons.

To this end, it is proposed in detail that the damping device has a damping element which is spaced apart from the two end stop faces in the retracted position, which damping element, during the drive movement, can be deformed plastically by way of axial contact of one of the end stop faces and, in a plastically deformed state, is driven by way of said end stop face as far as the respective other end stop face.

In the plastically deformed state, while the damping element is being moved toward the respective other end stop face, the damping element produces a frictional force between the drive sections. In the case of movements of the damping element in the non-deformed state, frictional forces of this type are preferably not produced. In other words, in the plastically deformed state, the damping element is jammed or wedged between the two drive sections which move relative to one another, as a result of which the movement between the drive sections is further damped or braked.

One drive section may be formed by a tube and the other drive section may be formed by a rod which is guided therein. The rod may be a spindle of a spindle/spindle nut mechanism and the tube may be a spindle nut tube connected in an axially fixed manner to the spindle nut of the spindle/spindle nut mechanism and in a fixed manner so as to rotate with said spindle nut. The spindle can then be connected to the one drive connector and the spindle nut tube can be connected to the other drive connector, with the result that relative movements between the spindle and the spindle nut lead to linear movements between the drive connectors along the geometric spindle axis. A drive unit may be connected upstream of the spindle/spindle nut mechanism, which drive unit has a drive motor and possibly an intermediate gear mechanism, the drive unit bringing about, in particular, a rotation of the spindle. It is also conceivable here for an overload case that the spindle and the spindle nut are temporarily brought out of engagement, in order to avoid damage of the spindle/spindle nut mechanism.

One end stop face, the impact of which deforms the damping element plastically, can be configured on the inner side of the tube, in particular in the form of at least one radially inwardly pointing projection. The other end stop face can be configured on the outer side of the rod, in particular in the form of at least one radially outwardly pointing projection. The damping element is then arranged axially between said two end stop faces.

The damping element may be a further stop nut which is, for example, structurally identical to a stop nut which forms the one end stop face. A stop nut means, in particular, a sleeve-shaped or cap-shaped element which is connected in an axially fixed manner to the respective drive section, the rod or spindle. The connection may be established by way of crimping.

BRIEF DESCRIPTION OF THE DRAWINGS

In the following text, the invention will be described in greater detail on the basis of a drawing which illustrates merely one exemplary embodiment and in which.

DETAILED DESCRIPTION

Figure 1:
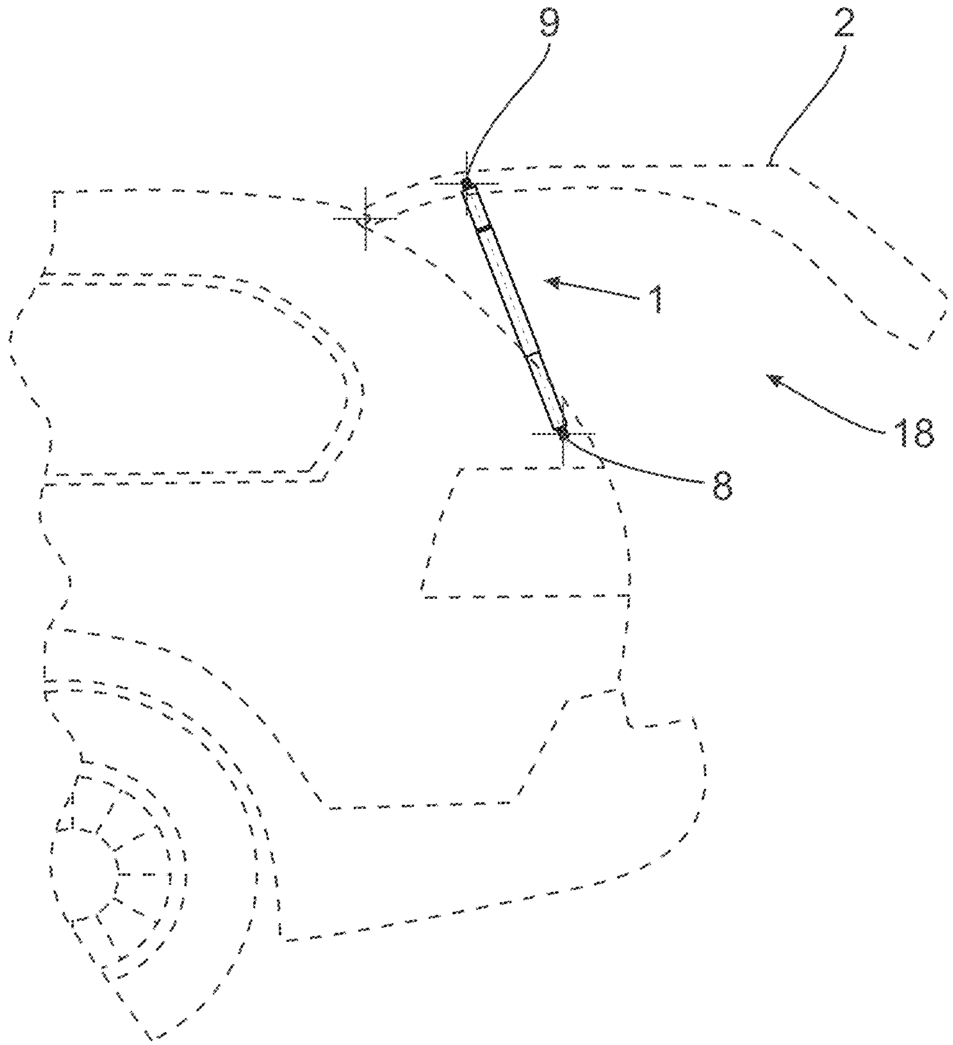
FIG. 1 shows a highly diagrammatic illustration of the rear region of a motor vehicle with a tailgate which is equipped with a drive apparatus according to the proposal, FIGS. 2(*a*)-2(*b*) shows a sectioned side view of the apparatus according to FIG. 1, which FIG. 2(*a*) is in the retracted position and FIG. 2(*b*) is in the extended position, and FIGS. 3(*a*)-3(*c*) shows a diagrammatic illustration of the operating principle of a damping device of the drive apparatus according to FIG. 1, where FIG. 3(*a*) represents the damping device in normal operation, FIG. 3(*b*) represents the damping device at the beginning of an impact, and FIG. 3(*c*) represents how the damping element is deformed plastically.
Figures 2A, 2B:
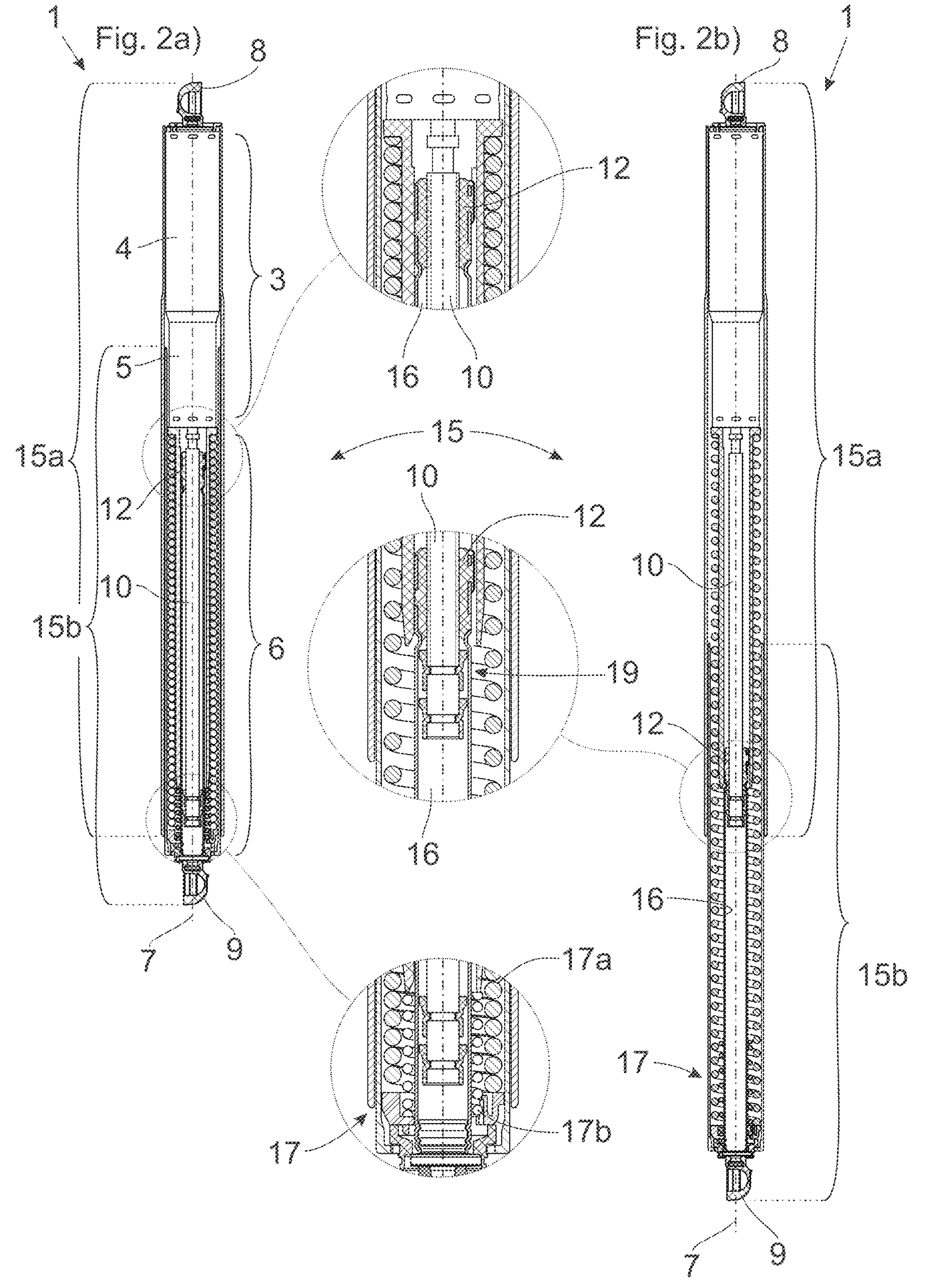

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known drive apparatus (WO 2015/032554 A1), from which the invention proceeds, is configured as a spindle drive. The spindle drive serves for the adjustment of a closure element as defined above of a motor vehicle. To this end, the spindle drive is equipped with a drive motor and a spindle/spindle nut mechanism which is connected downstream of the drive motor in order to produce drive movements. In order to divert the drive movements, the spindle drive has two drive sections with in each case one drive connector, the drive connectors being moved axially apart from one another in the case of the extension of the spindle drive and being moved axially toward one another in the case of the retraction of the spindle drive.

The drive apparatus which is shown in the drawing is configured as a spindle drive 1 and serves for the motorized adjustment of a closure element 2 of a motor vehicle, which closure element 2 is configured here by way of example as a tailgate. With regard to the further understanding of the term "closure element", reference may be made to the introductory part of the description. In the following text, the invention will be described on the basis of a closure element 2 which is configured as a tailgate, since it is precisely here that there has to be particularly high reliability of the drive apparatus on account of the comparatively high forces which are brought about by way of the weight of the closure element 2.

The spindle drive 1 may be equipped with a electric drive unit 3 which has an electric drive motor 4 and an intermediate gear mechanism 5 which is connected downstream of the drive motor 4. A spindle/spindle nut mechanism 6 with a geometric spindle axis 7 for the production of linear drive movements between two drive connectors 8, 9 is connected downstream of the drive unit 3 to facilitate the transmission of driving forces and torque. In a way which is customary per se, the spindle/spindle nut mechanism 6 has a spindle 10 with a spindle external thread 11 and a spindle nut 12 with a spindle nut internal thread 13, which threads form a screw engagement 14 with one another.

The drive apparatus in the form of the spindle drive 1 has a drive train 15 with two drive sections 15*a*, 15*b*, each drive section 15*a*, 15*b* in each case having an associated drive connector 8, 9. The two drive sections 15*a*, 15*b* can be moved linearly with respect to one another, in a manner which is driven by way of the spindle/spindle nut mechanism 6. Thus, in the case of the exemplary embodiment which is selected here, the spindle 10 is assigned to the drive section 15*a* and therefore to the drive connector 8, whereas the spindle nut 12 is assigned to the drive section 15*b* and therefore to the drive connector 9. By way of actuation of the drive unit 3, the spindle 10 is set in rotation, and the spindle nut 12 is moved axially relative to the spindle 10. For example, the spindle nut 12 is connected in an axially fixed manner to a spindle nut tube 16, the spindle nut tube 16 in turn being connected to the drive connector 9. In this way, the relative movement between the spindle 10 and the spindle nut 12 is transmitted via the spindle nut tube 16 to the drive connector 9, as a result of which the drive connectors 8, 9 move relative to one another correspondingly.

In the assembled state which is shown in FIG. 1, the spindle drive 1 is coupled in terms of drive to the closure element 2. Here, in the above-described way, the spindle drive 1 assumes the adjustment of the closure element 2 (here, the tailgate), between the open position which is shown in FIG. 1 and a closed position (not shown). It is to be mentioned for the sake of completeness that the drive apparatus which is shown here as a spindle drive 1 by way of example can also be actuated manually; that is to say, the user can also open and/or close the closure element 2 manually. In order to make a manual adjustment possible despite the drive unit 3 with drive motor 4 which is optionally provided here, the drive apparatus can have, furthermore, an overload coupling (not shown). It is also fundamentally conceivable for a drive apparatus to be configured such that it can be actuated in a purely manual manner, and for a drive unit as described above to be dispensed with.

Moreover, the drive apparatus or the spindle drive 1 has a spring arrangement 17 which prestresses the two drive sections 15*a*, 15*b* against one another into the extended position, and therefore presses the closure element 2 into the open position. For example, the spring arrangement 17 has two compression springs 17*a*, 17*b* which are configured in such a way that, when the spindle drive 1 is situated in the retracted position, a higher pressure force is initially provided in a first section in the case of the drive movement out of the retracted position in the direction of the extended position than in the further course of the drive movement.

In the case of the exemplary embodiment which is shown in FIG. 1 and to this extent is preferred, a total of two drive apparatuses (for example, two spindle drives 1) are provided which are arranged on two opposite edge regions of a closure element opening 18 (here, a tailgate opening). It can also fundamentally be provided, however, that merely one drive apparatus of this type is provided which is then arranged, in particular, on one of the edge regions of the closure element opening 18.

Furthermore, the drive apparatus which is described here has an end stop 19, in order to limit the drive movement between the drive connectors 8, 9 to the extended position. The end stop 19 has end stop faces 19*a*, 19*b* on in each case one associated drive section 15*a*, 15*b*, which end stop faces

19*a*, 19*b* can be moved toward one another, and a damping device 20 which, during a drive movement into the end stop 19, damps the drive movement in a manner which is dependent on its speed. Here, a great impact force occurs in the end stop 19, which impact force is to be received by way of the damping device 20 and is to be absorbed as completely as possible.

Figures 3A, 3B, 3C:
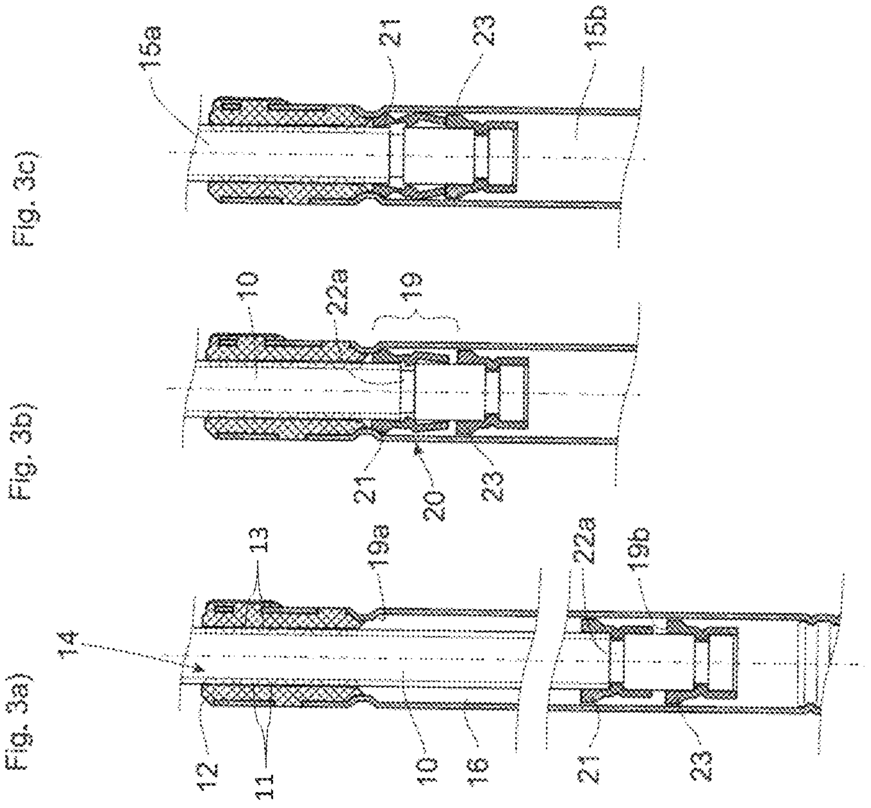

It is essential here that the damping device 20 has a damping element 21 which is spaced apart axially from the two end stop faces 19*a*, 19*b* in the retracted position (FIG. 3*a*), that, during the drive movement, it can be deformed plastically by way of axial contact of one of the end stop faces (here, the end stop face 19*a*) (FIG. 3*b*), and, in a plastically deformed state, is driven by way of said end stop face as far as the respective other end stop face 19*b* (FIG. 3*c*).

By way of the configuration according to the proposal of the damping device 20, the impact energy is therefore damped in two ways. Thus, part of the impact energy is already absorbed firstly by way of the plastic deformation of the damping element 21. A further part of the impact energy is absorbed by the fact that the damping element 21 is moved as far as the other end stop face 19*b* by way of the end stop face 19*a*, with which it comes into contact first of all, which is made possible by virtue of the fact that, in the normal state, that is to say before the impact and/or before its deformation, the damping element 21 is spaced apart from the end stop face 19*b*. In this way, further impact energy can be absorbed via the additional distance which the damping element 21 has to cover after the impact, preferably in such a way that the end stop face 19*b* or the component which forms the end stop face 19*b* does not yield from its axial position and therefore holds the drive sections 15*a*, 15*b* together reliably.

FIG. 3*a* shows the situation before an undesired impact as defined above, or the situation in normal operation. As can be seen clearly, the two end stop faces 19*a*, 19*b* are spaced apart axially from the damping element 21.

FIG. 3*b* shows the situation at the beginning of an impact, the end stop face 19*a* coming into contact axially with the damping element 21 and deforming the latter plastically. Here, the plastic deformation is brought about or at least assisted by virtue of the fact that the damping element 21 is torn from its original anchoring, in which it was previously connected in an axially fixed manner to the associated drive section 15*a* or the spindle 10 here. For example, the damping element 21 is crimped to the spindle 10, that is to say is pressed into a circumferential groove 22*a*. The damping element 21 is then deformed plastically by being pressed out of the groove 22*a*.

FIG. 3*c* then shows how the damping element 21 which is deformed plastically to a further extent than FIG. 3*b* is moved further in the direction of the second end stop face 19*b*. For example, the damping element is deformed plastically to such a pronounced extent that it comes into contact with the two drive sections 15*a*, 15*b* (here, both with the spindle 10 and with the spindle nut tube 16). In this way, a frictional force is produced between the drive sections 15*a*, 15*b* or between the spindle 10 and the spindle nut tube 16, as a result of which an additional damping action is achieved. In order not to disrupt the normal operation, as FIG. 3 shows, the damping element 21 is originally shaped in such a way, however, that no frictional force is produced between the drive sections 15*a*, 15*b*.

As has already been described above, a spindle/spindle nut mechanism 6 is provided in the case of the present exemplary embodiment of a drive apparatus according to the proposal, which results (for example) in the following construction. Here, one drive section 15*b* thus comprises a tube, namely the spindle nut tube 16, and the other drive section 15*a* comprises a rod, namely the spindle 10. In the case of said embodiment, the rod is generally in sliding engagement with the inner side of the tube. An embodiment would also fundamentally be conceivable, in the case of which the rod is in screwing engagement with the inner side of the tube. As an example, however, a purely axial relative movement between the rod and the tube, or between the drive sections 15*a*, 15*b*, is intended to be the aim.

The one end stop face 19*a*, the impact of which deforms the damping element 21 plastically, is configured here on the inner side of the spindle nut tube 16, and is formed here, in particular, by at least one radially inwardly pointing projection. Here, said at least one projection is in contact with an axial end of the spindle nut 12. The projection can fundamentally also form an axial end of the spindle nut 12. The other, opposite end stop face 19*b*, toward which the plastically deformed damping element 21 is moved, is configured on the outer side of the rod or spindle 10, and is formed, in particular, by at least one radially outwardly pointing projection. As an example, the projection which forms the end stop face 19*b* is configured on a stop nut 23 which is connected in an axially fixed manner to the remaining rod or spindle 10. Here, the stop nut 23 is configured as a stop sleeve which is connected to the rod or spindle 10 in the same way as the damping element 21, namely is crimped.

The damping element 21 is also configured here as a stop nut, and may be structurally identical to the stop nut 23 which forms the end stop face 19*b*.

As has been described above, the damping element 21 is connected in an axially fixed manner to one of the two drive sections 15*a*, 15*b*, and is deformed plastically by way of the axial impact of the one end stop face 15*a* in such a way that the axially fixed connection of the damping element 21 is released and, as a consequence, the damping element 21 moves away out of its previous position. As an example, in the normal state, that is to say in the non-deformed state, the damping element 21 is connected in an axially fixed manner to the rod or spindle 10, and is deformed plastically by way of the axial impact of that end stop face 19*a* which is formed by the radially inwardly pointing projection. It is to be mentioned merely for the sake of completeness that, in another embodiment, the damping element 21 can also as an alternative be connected in an axially fixed manner to the tube or the spindle nut tube 16, and would then be deformed plastically accordingly by way of the axial impact of the other end stop face 19*b* or the outwardly pointing projection of the stop nut 23. In this case, the end stop face 19*b* which is configured on the rod or spindle 10 would then move the damping element 21 in its plastically deformed state to the end stop face 19*a* of the tube or spindle nut tube 16. That variant is preferred, however, in the case of which the damping element 21 is fastened, just like the stop nut 23, to one and the same component, namely the spindle 10 here, the damping element and the stop nut 23 which forms the end stop face 19*b* particularly preferably being of structurally identical configuration.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

1 spindle drive
2 closure element
3 drive unit
4 drive motor
5 intermediate gear mechanism
6 spindle/spindle nut mechanism
7 geometric spindle axis
8 drive connector
9 drive connector
10 spindle
11 spindle external thread
12 spindle nut
13 spindle nut internal thread
14 screw engagement
15 drive train
16 spindle nut tube
17 spring arrangement
18 closure element opening
19 end stop
20 damping device
21 damping element
23 stop nut
15*a* drive section
15*b* drive section
17*a* compression springs
17*b* compression springs
19*a* end stop face
19*b* end stop face
22*a* groove While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A drive apparatus for use with a closure element of a motor vehicle, the drive apparatus comprising:

a drive train provided with two drive sections, each of the two drive sections including a drive connector, wherein the two drive sections are configured to move linearly with respect to one another to create linear drive movements along an axis between the drive connectors between a retracted position and an extended position of the two drive sections;

a spring arrangement configured to bias the drive sections relative to one another towards the extended position;

an end stop arrangement configured to limit movement of the drive connectors away from each other when the two drive sections are moved towards the extended position, wherein the end stop arrangement comprises a first end stop face of one of the drive sections and a second end stop face of the other one of the drive sections, wherein the end stop faces are configured to move toward one another; and a damping device configured to dampen the movement of the drive connectors away from each other as the two drive sections are moved toward the extended position, wherein the movement of the two drive sections toward the extended position is limited by the end stop arrangement based on a relative speed of the end stop faces, wherein the damping device is provided with a damping element, wherein when the drive sections are in the retracted position, the damping element is axially spaced apart from the first end stop face and the second end stop face, and when the drive sections are in the extended position, the damping element is configured to axially contact and plastically deform against the first end stop face to change from a non-deformed state to a plastically deformed state, and wherein when the damping element is in the plastically deformed state, the two drive sections are configured to be driven until the second end stop face engages the damping element.

2. The drive apparatus of claim 1, wherein when the damping element is in the non-deformed state, the damping element produces a first frictional force between the drive sections and when the damping element is in the plastically deformed state, the damping element produces a second frictional force between the drive sections, greater than the first frictional force.

3. The drive apparatus of claim 1, wherein the one of the drive sections includes a tube and the other one of the drive sections includes a rod, wherein the rod is in engagement with an inner side of the tube.

4. The drive apparatus of claim 3, wherein when the damping element is in the non-deformed state, the damping element is connected to the rod with an axially fixed connection, and the damping element changes from the non-deformed state to the plastically deformed state as the damping element axially engages the first end stop face defined by the tube and extending inwardly from the tube.

5. The drive apparatus of claim 3, wherein the rod is a spindle and the tube is a spindle nut tube including a spindle nut.

6. The drive apparatus of claim 5, wherein the second end stop face is formed by at least one radially outwardly pointing projection formed by a first stop nut axially fixed and connected to the spindle.

7. The drive apparatus of claim 6, wherein the damping element is formed by a second stop nut, and the dimensions of the second stop nut and the material of the second stop nut are identical to the dimensions and the material of the first stop nut.

8. The drive apparatus of claim 7, wherein the second stop nut is crimped to the spindle.

9. The drive apparatus of claim 1, wherein the one of the drive sections includes a tube and the other one of the drive sections includes a rod, wherein the rod is in threaded engagement with an inner side of the tube.

10. The drive apparatus of claim 9, wherein the inner side of the tube forms the first end stop face.

11. The drive apparatus of claim 10, wherein the second end stop face is on an outer side of the rod.

12. The drive apparatus of claim 11, wherein when the damping element is in the non-deformed state, the damping element is connected to the rod with an axially fixed connection, and when the damping element is in the plastically deformed state, the axially fixed connection of the damping element is released.

13. A drive apparatus configured to open and close a closure element of a motor vehicle, the drive apparatus comprising:

a tube defining an axis;

a spindle nut disposed within the tube and connected and fixed axially to the tube;

a spindle disposed within the tube, the spindle nut being operatively engaged to the spindle, wherein the spindle, while rotating in the spindle nut, is configured to move relative to the tube along the axis from an extended position to a first retracted position and a second retracted position;

a stop nut fixed to the spindle; and a damping element disposed between the spindle nut and the stop nut, wherein the tube defines a first end stop face and the stop nut defines a second end stop face, and wherein when the spindle is in the first retracted position, the damping element engages the first end stop face and is spaced apart from the stop nut, wherein when the spindle is in the first retracted position, the damping element is plastically deformed from a non-deformed state to a plastically deformed state.

14. The drive apparatus of claim 13, wherein when the spindle is in the second retracted position, the second end stop face engages the damping element so that portions of the damping element are plastically deformed and move in the radial directions.

15. A drive apparatus configured to open and close a closure element of a motor vehicle, the drive apparatus comprising:

a tube defining an axis and having a circumferential projection extending towards the axis, wherein the circumferential projection defines a first end stop face;

a spindle nut disposed within the tube and connected and fixed axially to the tube;

a spindle disposed within the tube, the spindle nut being operatively engaged to the spindle, wherein the spindle, while rotating in the spindle nut, is configured to move relative to the tube along the axis from an extended position to a first retracted position and a second retracted position;

a first stop nut fixed to the spindle; and a damping element disposed between the spindle nut and the first stop nut, wherein the first stop nut defines a second end stop face, and wherein when the spindle is in the first retracted position, the damping element axially engages the first end stop face and is spaced apart from the first stop nut, wherein the damping element is formed by a second stop nut, the dimensions of the second stop nut and the material of the second stop nut being identical to the dimensions and the material of the first stop nut.

16. The drive apparatus of claim 15, wherein when the spindle is in the second retracted position relative to the tube along the axis, a portion of the damping element is disposed radially between the circumferential projection and the spindle.

17. The drive apparatus of claim 16, wherein when the spindle is in the extended position relative to the tube along the axis, the damping element is spaced apart from the first stop nut and the circumferential projection.

* * * * *